Figure 1:
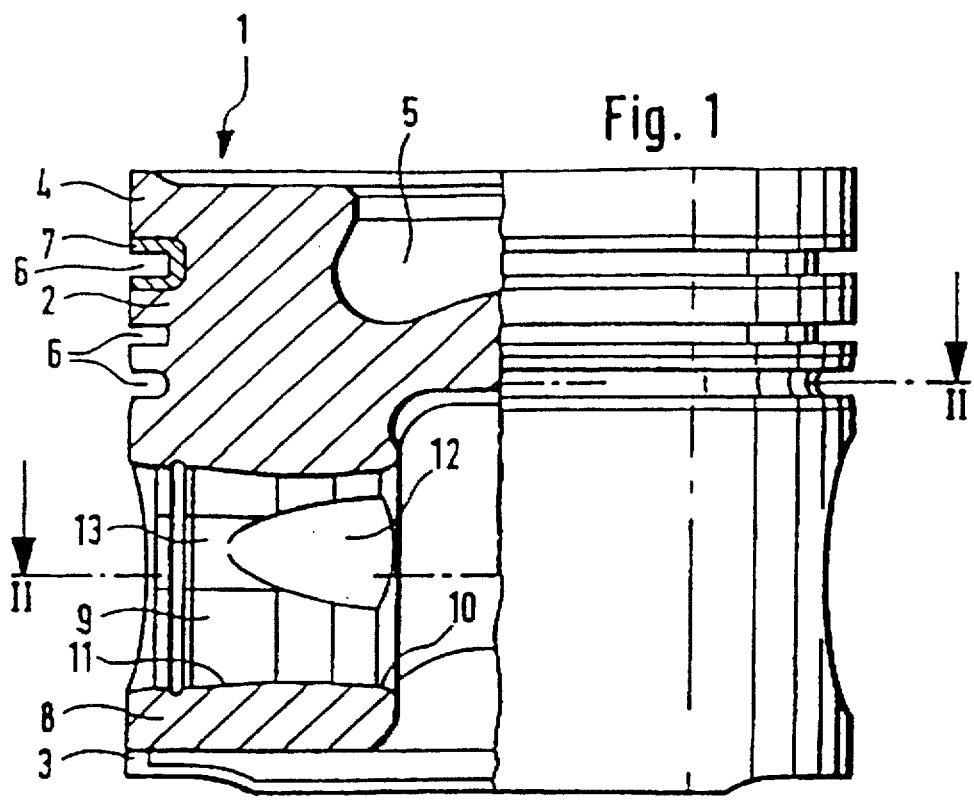

United States Patent
Issler et al.

[11] Patent Number: 5,746,169
[45] Date of Patent: May 5, 1998

[54] LIGHT-METAL PISTON FOR HIGHLY STRESSED INTERNAL COMBUSTION ENGINES

[75] Inventors: Wolfgang Issler, Schwaikheim; Helmut Kollotzek, Mutlangen, both of Germany

[73] Assignee: Mahle GmbH, Stuttgart, Germany

[21] Appl. No.: 776,069

[22] PCT Filed: Aug. 7, 1995

[86] PCT No.: PCT/DE95/01064

§ 371 Date: Jan. 7, 1997

§ 102(e) Date: Jan. 7, 1997

[87] PCT Pub. No.: WO96/07841

PCT Pub. Date: Mar. 14, 1996

[30] Foreign Application Priority Data

Sep. 8, 1994 [DE] Germany .................. 44 31 990.8

[51] Int. Cl.⁶ .................................................. F16J 1/16
[52] U.S. Cl. .................................... 123/193.6; 92/187
[58] Field of Search ........................ 123/193.6; 92/187, 92/228, 208

[56] References Cited

U.S. PATENT DOCUMENTS 3,000,676  9/1961  Cheney et al. ............. 123/193.8
3,357,318  12/1967 Packard et al. .
4,890,543  1/1990  Kudou et al. ............. 123/193.6
5,111,737  5/1992  Dormer et al. .............. 92/187

FOREIGN PATENT DOCUMENTS 2157319  6/1973  France .
3036062  4/1982  Germany .
3301366  7/1984  Germany .
3609019  9/1987  Germany .

*Primary Examiner*—Marguerite McMahon
*Attorney, Agent, or Firm*—Collard & Roe, P.C.

[57] ABSTRACT

In a light-metal piston for highly stressed internal combustion engines with a combustion chamber in the piston head, in order to keep the stresses at the edge of the combustion chamber low without unnecessarily increasing the stresses in the support and the gudgeon pin boss, the following features are provided in combination: the combustion chamber in the piston head is not reinforced; the drilling of gudgeon pin boss is widened (crowned) at and towards its inner end at least in a partial region X of its entire length; the drilling in each gudgeon pin boss is a shaped drilling widening conically from the outside at least in a partial region Z; the drilling of each gudgeon pin boss has two oblique wells running from its inner end.

11 Claims, 1 Drawing Sheet

5,746,169

LIGHT-METAL PISTON FOR HIGHLY STRESSED INTERNAL COMBUSTION ENGINES

The invention relates to a light-metal piston for highly stressed internal combustion engines according to the introductory part of claim 1.

DE-OS 43 27 772, which is not an earlier publication with respect to the priority date of the present application, is based on the following state of the art: In connection with light-metal pistons that are known in practical life, various measures have been taken in order to permit such pistons to withstand the mechanical stresses caused by the ignition pressure, for the purpose of reducing, on the one hand, the deflection of the gudgeon pin, which may lead to cracks in the gudgeon pin bosses, and for protecting the combustion chamber against hairline cracking, on the other hand. For said purposes, such light-metal pistons are provided, for example with liners in the bores of the gudgeon pin bosses, and the combustion chamber is provided with an additional reinforcement.

For preventing boss hairline cracks, it is known from DE-PS 36 09 019 to provide the boss bores each on both sides with pocket-like recesses produced from the inner end of the boss bores, such recesses extending across a certain length in the longitudinal direction of the boss bores. A connection between said recesses and the end of the boss bore on the outer side of the piston is secured by corresponding grooves in the boss bores.

The present invention deals with the problem of enhancing the design according to DE-OS 43 27 772.

Said problem is solved with a light-metal piston having the features according to the characterizing part of claim 1.

Advantageous developments of the invention are contained in the dependent claims.

Figure 2:
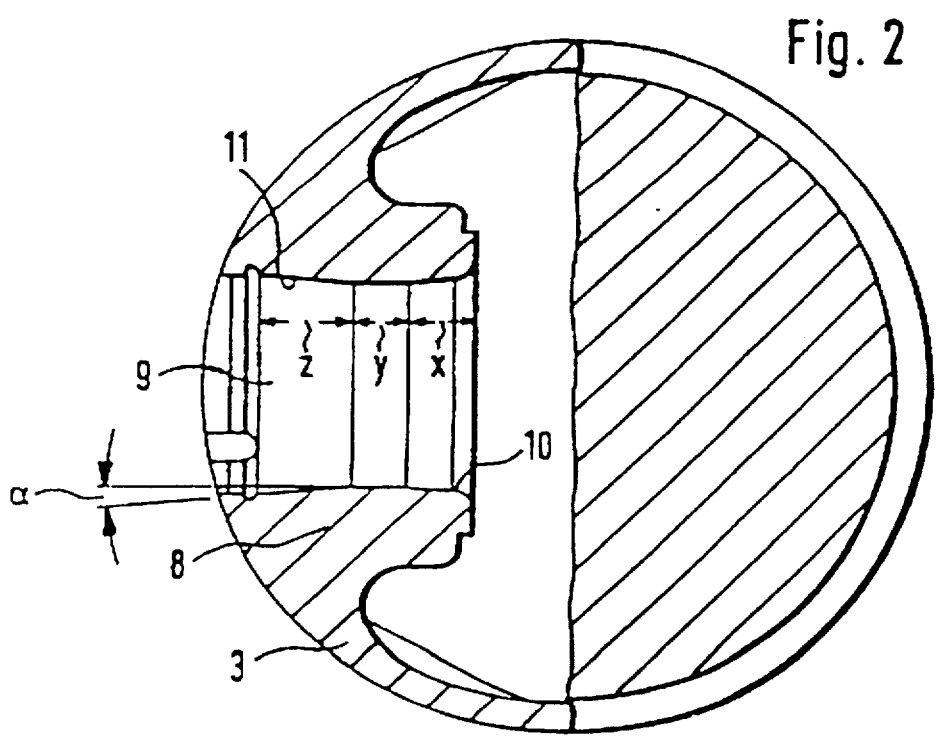

The invention is explained in greater detail on a preferred exemplified embodiment shown in the drawing, in which:

FIG. 1 shows a lateral, partly sectional view of a light-metal piston according to the invention; and FIG. 2 shows a top view of the section II—II according to FIG. 1.

A light-metal piston 1 for an internal combustion engine, in particular for a highly stressed Diesel engine for a motor vehicle, consists in one piece of a piston crown 2 and a piston shaft 3. In a piston head 4 of the piston crown 2, a combustion chamber 5—which is not reinforced—and the annular grooves 6 are shaped by molding, whereby the uppermost annular groove 6 is reinforced with a ring support 7. The gudgeon pin bosses 8 are integrated in the piston shaft 3, said bosses having the bores 9 for receiving a piston pin (not shown in the drawing) At its inner end 10, each bore 9 is widened (crowned) in a partial zone x towards its inner end, whereby the curvature of said widening may be shaped in the form of a polygon. The transition of said widening into the face area of the boss has a radius of 3 mm, whereby the axial length of the rounding in the longitudinal direction of the piston pin amounts to 1 mm with a piston having a diameter of 80 mm. Furthermore, in a partial zone Z, the bore 9 is designed as a shaped bore 11 which, in the partial zone Z extending from the outside inwardly and conforming to the supporting zone, the latter being outwardly limited by the groove for the safety ring of the piston pin, widens conically from the inside to the outside, for example in the form of a trumpet. The widening (shown with an exaggerated size in the drawing) extends with an angle alpha of 5 minutes. The widening, which should extend with an angle of 2 to 10 minutes, may also be stepped, whereby the widening in the more inner partial zone Z of the shaped bore 11 should have a smaller angle than the more outwardly disposed zone of the shaped bore 11.

Between the outwardly conically widening shaped bore 11 in the partial zone Z and the widening (crowning) provided at the inner end 10 in the partial zone X of the bore, the bore 9 has a cylindrically extending zone Y.

Furthermore, in the bore 9 of each gudgeon pin boss 8, two slanted, pocket-like recesses (the pockets 12) are shaped by molding, starting from the inner end 10 of the bore 9, said recesses being disposed unsymmetrically relative to the longitudinal axis of the piston pin with respect to their vertical position and having their greatest depth at the inner end 10 of the bore 9, and ending after about ⅔ parts of the length of the bore 9 in the surface of the shaped bore 11 A connection between the slanted pockets 12 and the end of bore 9 on the outer side of the piston is formed in each case by a groove 13 extending in the direction of the longitudinal axis of the piston pin.

Such a design creates in a constructionally simple way a light-metal piston that assures an improvement especially with respect to boss strength.

We claim:

1. Light-metal piston for highly stressed internal combustion engines, comprising a piston head having a combustion chamber and an annular groove part, and a piston shaft with integrated gudgeon pin bosses and bores, each bore having an inner end and an outer end, said piston having the following features in combination:

(a) The combustion chamber in the piston head is not reinforced;

(b) The bore of each gudgeon pin boss is widened at and toward its inner end in at least a partial zone x of the total length of the boss bore;

(c) The bore of each gudgeon pin boss substantially conically widens at and toward its outer end in a partial zone z of the total length of the boss bore defining a supporting zone;

(d) The bore of each gudgeon pin boss has two slanted pockets starting from its inner end; and (e) The ignition pressure occurring during combustion is higher than 120 bar.

2. Light-metal piston according to claim 1, wherein the bore in the partial zone x has a polygon-shaped cross-section.

3. Light-metal piston according to claim 1, characterized in that the bore of the gudgeon pin boss is widened in the partial zone Z from the inside outwardly in the form of a trumpet.

4. Light-metal piston according to claim 1, wherein the bore of the gudgeon pin boss widens in the partial zone z at an angle of between 2 and 10 minutes.

5. Light-metal piston according to claim 1, characterized in that the widening of the bore of the gudgeon pin boss in the partial zone Z is stepped.

6. Light-metal piston according to claim 1, wherein the angle of widening of the bore of the gudgeon pin boss in the partial zone Z increases from an inner widening to an outer widening toward the outer end of the bore.

7. Light-metal piston according to claim 6, characterized in that the inner widening disposed in the partial zone Z has an angle of 2 to 4 minutes, and the outer widening has an angle of 5 to 10 minutes.

8. Light-metal piston according to claim 1, wherein the bore, between the partial zone z and the partial zone X, has a cylindrical zone Y.

9. Light-metal piston according to claim 1, characterized in that the greatest depth of the slanted pocket is disposed at the inner end of the gudgeon pin boss.

10. Light-metal piston according to claim 1, characterized in that the slanted pocket is shaped by molding with an angle of 2 to 5 degrees relative to a plane parallel with the longitudinal axis of the gudgeon.

11. Light-metal piston according to claim 1, wherein the bore has a longitudinal axis and the vertical positions of said slanted pockets are not aligned with said longitudinal axis.

* * * * *